(12) United States Patent
Szeliski

(10) Patent No.: US 7,822,289 B2
(45) Date of Patent: Oct. 26, 2010

(54) LOCALLY ADAPTED HIERARCHICAL BASIS PRECONDITIONING

(75) Inventor: Richard Szeliski, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 887 days.

(21) Appl. No.: 11/459,724

(22) Filed: Jul. 25, 2006

(65) Prior Publication Data

US 2008/0025633 A1 Jan. 31, 2008

(51) Int. Cl.
G06K 9/36 (2006.01)
G06K 9/40 (2006.01)

(52) U.S. Cl. ....................... 382/276; 382/274

(58) Field of Classification Search ........ 382/108, 382/162, 276, 274, 284, 299, 300, 305; 703/11; 358/521, 525, 535
See application file for complete search history.

(56) References Cited

U.S. PATENT DOCUMENTS

| | | | |
|---|---|---|---|
| 5,513,120 | A | 4/1996 | Berlad |
| 6,094,511 | A | 7/2000 | Metcalfe |
| 6,389,154 | B1 * | 5/2002 | Stam .......................... 382/108 |
| 6,856,705 | B2 | 2/2005 | Perez |
| 6,894,720 | B2 | 5/2005 | Zhang |
| 7,010,174 | B2 | 3/2006 | Kang |
| 7,023,580 | B2 | 4/2006 | Zhang |
| 7,353,153 | B2 * | 4/2008 | Ascenzi et al. ............... 703/11 |
| 2005/0104900 | A1 | 5/2005 | Toyama |
| 2005/0243176 | A1 | 11/2005 | Wu |

FOREIGN PATENT DOCUMENTS

GB 2325837 2/1998

OTHER PUBLICATIONS

Ledda, et al., "Evaluation of Tone Mapping Operators using a High Dynamic Range Display" Evaluation of tone mapping operators using a High Dynamic Range display. ACM Trans. Graph. 24, 3 (Jul. 2005), 640-648.

Aksoylu, et al. "An Odyssey into Local Refinement and Multilevel Preconditioning II: Stabilizing Hierarchical Basis Methods" SIAM Journal on Scientific Computing, 25 (2). pp. 478-498. ISSN 1064-8275, 2003.

(Continued)

*Primary Examiner*—Kanji Patel
(74) *Attorney, Agent, or Firm*—Lyon & Harr, LLP; Mark A. Watson

(57) ABSTRACT

A "Finite Element Preconditioner" provides locally adapted hierarchical basis functions for preconditioning large data optimization problems. For example, a few of the many typical graphics applications that make use of iterative optimization solutions include tone mapping, gradient domain blending, colorization, and scattered data interpolation. Preconditioning image data for such optimization problems allows those image optimization problems to be solved using less computational overhead and therefore to produce better quality image outputs with less computational overhead. The Finite Element Preconditioner evaluates data, such as image data, to adapt hierarchical basis functions to inhomogeneous problems for preconditioning large optimization problems. Specifically, the Finite Element Preconditioner evaluates the local structure of a coefficient matrix derived from the data and performs a recursive set of variable eliminations, combined with a simplification of the resulting coarse level problems to obtain bases better suited for problems with inhomogeneous (spatially varying) data, smoothness, and boundary constraints.

20 Claims, 8 Drawing Sheets

OTHER PUBLICATIONS

Schmidt, et al. "ALBERT: An adaptive hierarchical finite element toolbox" Preprint Jun. 2000 Freiburg, 2000.

Krysl, et al. "Natural Hierarchical Refinement for Finite Element Methods" International Journal for Numerical Methods in Engineering, vol. 56, Num 8, pp. 1109-1124, Feb. 2003.

Bolz, et al. "Sparse Matrix Solvers on the GPU: Conjugate Gradients and Multigrid," SIGGRAPH, pp. 917-924, 2003.

Agarwala, A., et al. 2004. Interactive digital photomontage. ACM Transactions on Graphics 23, 3 (August), 292-300.

Brand, C. W. 1992. An incomplete factorization preconditioning using repeated red-black ordering. Numer. Math. 61, 433-454.

Briggs, W. L., Henson, V. E., and McCormick, S. F. 2000. A Multigrid Tutorial, second ed. Society for Industrial and Applied Mathematics, Philadelphia.

Crowley, J. L., and Stern, R. M. 1984. Fast computation of the difference of low-pass transform. Tech. Rreport CMU-RI-TR-82-18, Robotics Institute, Carnegie Mellon University, Nov. 1982.

Fattal, R., Lischinski, D., and Werman, M. 2002. Gradient domain high dynamic range compression. ACM Transactions on Graphics (TOG) 21, 3, 249-256.

Feilner, M., et al. 2005. An orthogonal family of quincunx wavelets with continuously adjustable order. IEEE Transactions on Image Processing 14, 4 (April), 499-520.

Gortler, S. J., and Cohen, M. F. 1995. Hierarchical and variational geometric modeling with wavelets. In Symposium on Interactive 3D Graphics, 35-43.

Gremban, K. D. 1996. Combinatorial Preconditioners for Sparse, Symmetric, Diagonally Dominant Linear Systems. PhD thesis, Carnegie Mellon University. CMU-CS-96-123.

Kobbelt, L., and Schröder, P. 1998. A multiresolution framework for variational subdivision. ACM Transactions on Graphics 17, 4 (October) 209-237.

Lai, S.-H., and Vemuri, B. C. 1997. Physically based adaptive preconditioning for early vision. IEEE Transactions on Pattern Analysis and Machine Intelligence 19, 6 (June), 594-607.

Levin, A., Lischinski, D., and Weiss, Y. 2004. Colorization using optimization. ACM Transactions on Graphics 23, 3 (August), 689-694.

Levin, A., Zomet, A., Peleg, S., and Weiss, Y. 2004. Seamless image stitching in the gradient domain. In Eighth European Conference on Computer Vision (ECCV 2004), Springer-Verlag, Prague, vol. IV, 377-389.

Notay, Y., and Amar, Z. O. 1997. A nearly optimal preconditioning based on recursive red-black ordering. Numerical Linear Alg. Appl. 4, 369-391.

Pentland, A. P. 1994. Interpolation using wavelet bases. IEEE Transactions on Pattern Analysis and Machine Intelligence 16, 4 (April), 410-414.

Perez, P., Gangnet, M., and Blake, A. 2003. Poisson image editing. ACM Transactions on Graphics 22, 3 (July), 313-318.

Schröder, P., and Sweldens, W. 1995. Spherical wavelets: Efficiently representing functions on the sphere. In Proceedings of SIGGRAPH 95, Computer Graphics Proceedings, Annual Conference Series, 161-172.

Sweldens, W. 1997. The lifting scheme: A construction of second generation wavelets. SIAM J. Math. Anal. 29, 2, 511-546.

Szeliski, R. 1990. Fast surface interpolation using hierarchical basis functions. IEEE Transactions on Pattern Analysis and Machine Intelligence 12, 6 (June), 513-528.

Terzopoulos, D., and Witkin, A. 1988. Physically-based models with rigid and deformable components. IEEE Computer Graphics and Applications 8, 6, 41-51.

Terzopoulos, D. 1986. Regularization of inverse visual problems involving discontinuities. IEEE Transactions on Pattern Analysis and Machine Intelligence PAMI-8, 4 (July), 413-424.

Yaou, M.-H., and Chang, W.-T. 1994. Fast surface interpolation using multiresolution wavelet transform. IEEE Transactions on Pattern Analysis and Machine Intelligence 16, 7 (July), 673-689.

Zhang, L., et al. 2002. Single view modeling of free-form scenes. Journal of Visualization and Computer Animation 13, 4, 225-235.

* cited by examiner

LOCALLY ADAPTED HIERARCHICAL BASIS PRECONDITIONING

BACKGROUND

1. Technical Field

The invention is related to data processing in finite element analysis, and in particular, to a technique for adapting hierarchical basis functions to inhomogeneous problems for preconditioning large optimization problems.

2. Related Art

Many finite element analysis problems, including many computer graphics problems, can be formulated as the solution of a set of spatially-varying linear or non-linear partial differential equations (PDEs). A few of the many such problems include computational photography algorithms such as high-dynamic range tone mapping, Poisson and gradient-domain blending, and colorization. Such problems also include various physically-based modeling problems such as elastic surface dynamics and the regularized solution of computer vision problems such as surface reconstruction, optic flow, and shape from shading. Techniques for addressing such continuous variational problems are well known to those skilled in the art.

For example, the discretization of these continuous variational problems using finite element or finite difference techniques yields large sparse systems of linear equations. Direct methods for solving sparse systems become inefficient for large multi-dimensional problems because of excessive amounts of fill-in that occurs during the solution. Therefore, in most cases, iterative solutions are a better choice. Unfortunately, as the problems become larger, the performance of iterative algorithms usually degrades due to the increased condition number of the associated systems. To address this problem, two different classes of techniques, both based on multi-level (hierarchical) representations, have traditionally been used to accelerate the convergence of iterative techniques.

For example, the first of these convergence acceleration techniques are generally referred to as multigrid techniques. In general, these multigrid techniques interpolate between different levels of resolution in an effort to alternately reduce the low- and high-frequency components of the resulting error. Unfortunately, such techniques work best for smoothly varying (homogeneous) problems, which is often not the case for many finite element or computer graphics applications.

The second class convergence acceleration techniques includes optimization algorithms such as a conjugate gradient preconditioned using a variety of techniques. Among these techniques, multi-level preconditioners such as hierarchical basis functions and wavelets are well suited for graphics applications because they exploit the natural multi-scale nature of many visual problems.

Unfortunately, while multi-level preconditioners have proven to be quite effective at accelerating the solution of such tasks, some problems remain. For example, the choice of basis functions and the number of levels is problem-dependent. In addition, such algorithms perform poorly on problems with large amounts of inhomogeneity, such as local discontinuities or irregularly spaced data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A "Finite Element Preconditioner," as described herein, provides locally adapted hierarchical basis functions for preconditioning large data optimization problems. In general, the techniques are described herein with respect to preconditioning of iterative image optimization problems, such as, for example, tone mapping, gradient domain blending, colorization, and scattered data interpolation. However, it should be understood that the preconditioning techniques described herein are generally applicable to the solution of many other large optimization problems, such as, for example, stereo matching, speech recognition, graph cut segmentation, fluid simulations, finite element analysis, etc. However, for purposes of explanation, the techniques enabled by the Finite Element Preconditioner will be described herein in terms of image processing.

In general, the well known concept of "preconditioning" provides a technique for improving the condition number of a matrix, thereby simplifying computations involving such matrices. As a result, preconditioning matrices derived from image data for use in solving iterative optimization problems allows those problems to be solved using less computational overhead and therefore to produce better quality image outputs with less computational overhead.

With respect to image-based applications, the Finite Element Preconditioner evaluates image data and locally adapts hierarchical basis functions for preconditioning those problems. The Finite Element Preconditioner achieves this preconditioning by evaluating the local structure of a coefficient matrix derived from the image data and performing a recursive set of variable eliminations, combined with a simplification of the resulting coarse level problems to obtain bases better suited for problems with inhomogeneous (spatially varying) data, smoothness, and boundary constraints.

In other words, the Finite Element Preconditioner operates to precondition arbitrary multi-dimensional variational problems by identifying an optimal set of hierarchical basis functions through an analysis of the underlying data. In the case of a one-dimensional first order system, a multi-resolution basis is constructed. For higher-dimensional problems, a similar methodology is used to derive locally adapted hierarchical basis functions that approximate an optimal preconditioning of arbitrary variational problems.

In either case, the Finite Element Preconditioner achieves this preconditioning by carefully examining the local structure of the coefficient matrix to perform a recursive set of variable eliminations combined with a simplification of the resulting coarse level problems. These variable eliminations are achieved by redistributing a "strength" of connections between eliminated variables to other off-diagonal and on-diagonal variables in a way that preserves a good finite-element approximation to the original variational problem. As a result, the matrices used in solving the corresponding problems are preconditioned for use in iterative solutions (such as conjugate gradients) to highly inhomogeneous 2D interpolation/reconstruction problems.

In view of the above summary, it is clear that the Finite Element Preconditioner described herein provides a unique system and method for preconditioning highly inhomogeneous 2D interpolation/reconstruction problems. In addition to the just described benefits, other advantages of the Finite Element Preconditioner will become apparent from the detailed description which follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

DETAILED DESCRIPTION

In the following description of various embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
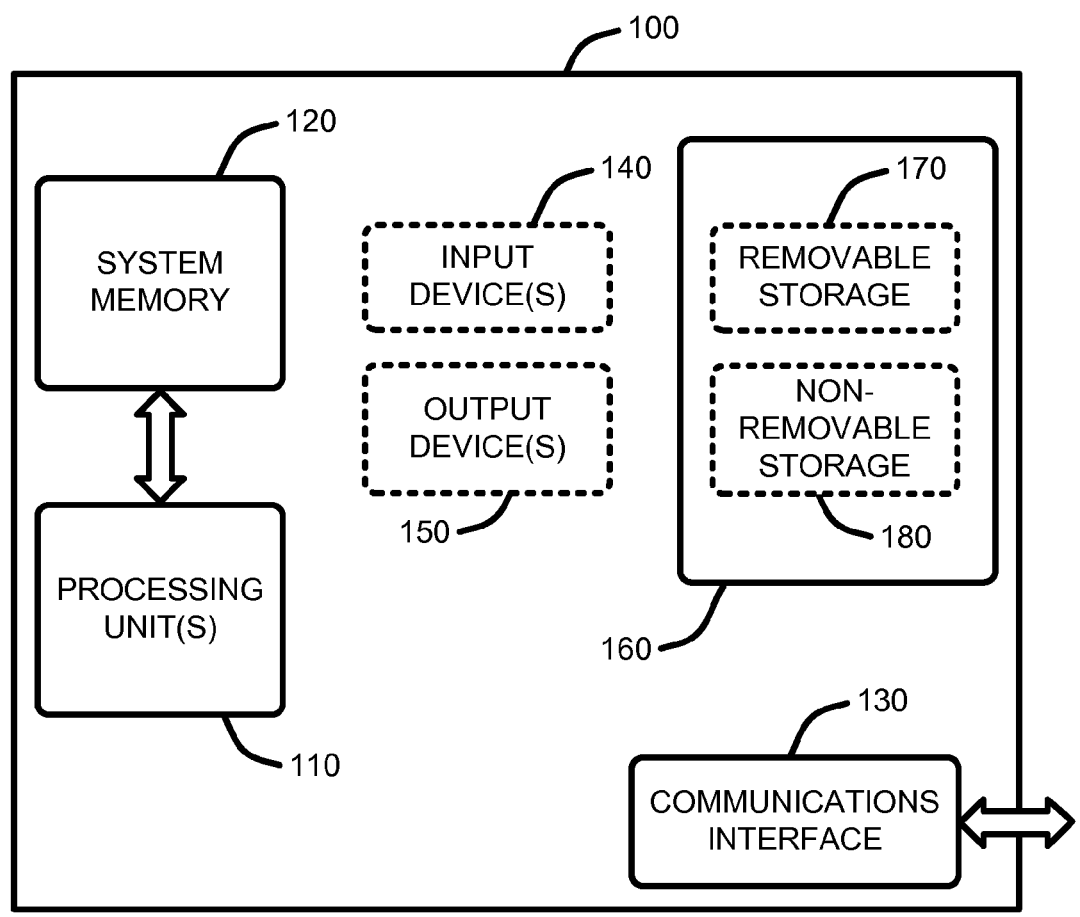
FIG. 1 is a general system diagram depicting a general-purpose computing device constituting an exemplary system for implementing a Finite Element Preconditioner, as described herein.

1.0 Exemplary Operating Environment:

FIG. 1 illustrates an example of a simplified computing environment on which various embodiments and elements of a "Finite Element Preconditioner," as described herein, may be implemented. It should be noted that any boxes that are represented by broken or dashed lines in FIG. 1 represent alternate embodiments of the simplified computing environment, as described herein, and that any or all of these alternate embodiments, as described below, may be used in combination with other alternate embodiments that are described throughout this document. At a minimum, to enable a computing device to implement the "Finite Element Preconditioner" (as described in further detail below), the computing device 100 must have some minimum computational capability and a wired or wireless communications interface 130 for receiving and/or sending data to/from the computing device.

In general, FIG. 1 illustrates an exemplary general computing system 100. The computing system 100 is only one example of a suitable computing environment and is not intended to suggest any limitation as to the scope of use or functionality of the invention. Neither should the computing system 100 be interpreted as having any dependency or requirement relating to any one or combination of components illustrated in the exemplary computing system 100.

In fact, the invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer in combination with various hardware modules. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

For example, with reference to FIG. 1, an exemplary system for implementing the invention includes a general-purpose computing device in the form of computing system 100. Components of the computing system 100 may include, but are not limited to, one or more processing units 110, a system memory 120, a communications interface 130, one or more input and/or output devices, 140 and 150, respectively, and data storage 160 that is removable and/or non-removable, 170 and 180, respectively.

The communications interface 130 is generally used for connecting the computing device 100 to other devices via any conventional interface or bus structures, such as, for example, a parallel port, a game port, a universal serial bus (USB), an IEEE 1394 interface, a Bluetooth™ wireless interface, an IEEE 802.11 wireless interface, etc. Such interfaces 130 are generally used to store or transfer information or program modules to or from the computing device 100.

The input devices 140 generally include devices such as a keyboard and pointing device, commonly referred to as a mouse, trackball, or touch pad. Such input devices may also include other devices such as a joystick, game pad, satellite dish, scanner, radio receiver, and a television or broadcast video receiver, or the like. Conventional output devices 150 include elements such as a computer monitors or other display devices, audio output devices, etc. Other input 140 and output 150 devices may include speech or audio input devices, such as a microphone or a microphone array, loudspeakers or other sound output device, etc.

The data storage 160 of computing device 100 typically includes a variety of computer readable storage media. Computer readable storage media can be any available media that can be accessed by computing device 100 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules, or other data.

Computer storage media includes, but is not limited to, RAM, ROM, PROM, EPROM, EEPROM, flash memory, or other memory technology; CD-ROM, digital versatile disks (DVD), or other optical disk storage; magnetic cassettes, magnetic tape, magnetic disk storage, hard disk drives, or other magnetic storage devices. Computer storage media also includes any other medium or communications media which can be used to store, transfer, or execute the desired information or program modules, and which can be accessed by the computing device 100. Communication media typically embodies computer readable instructions, data structures, program modules or other data provided via any conventional information delivery media or system.

The computing device 100 may also operate in a networked environment using logical connections to one or more remote computers, including, for example, a personal computer, a server, a router, a network PC, a peer device, or other common network node, and typically includes many or all of the elements described above relative to the computing device 100.

The exemplary operating environments having now been discussed, the remaining part of this description will be devoted to a discussion of the program modules and processes embodying the "Finite Element Preconditioner."

2.0 Introduction:

In general, a "Finite Element Preconditioner," as described herein provides a novel process for preconditioning matrices used for solving highly inhomogeneous 2D interpolation/reconstruction problems. Such preconditioning effectively reduces computational overhead when addressing such problems. As should be understood by those skilled in the art, the preconditioning techniques provided by the Finite Element Preconditioner are generally applicable to the solution of many types of large iterative optimization problems, such as, for example, stereo matching, speech recognition, graph cut segmentation, fluid simulations, finite element analysis, etc. However, for purposes of explanation, the techniques enabled by the Finite Element Preconditioner will be described herein in terms of preconditioning matrices for use in solving iterative image processing problems using conjugate gradient techniques.

2.1 System Overview:

In general, as noted above, the Finite Element Preconditioner described herein provides a system and method for preconditioning highly inhomogeneous 2D interpolation and/or reconstruction problems for reducing computational overhead when addressing such problems.

In addressing such problems, the Finite Element Preconditioner provides locally adapted hierarchical basis functions for preconditioning those problems. For example, a few of the many typical graphics applications that make use of iterative image optimizations include tone mapping, gradient domain blending, colorization, and scattered data interpolation. Preconditioning image data for such iterative optimization problems allows those image optimization problems to be solved using less computational overhead and therefore to produce better quality image outputs with less computational overhead.

With respect to optimization of image processing problems, the Finite Element Preconditioner evaluates matrices derived from image data to adapt hierarchical basis functions to that data for preconditioning conjugate gradients for efficiently solving large image optimization problems. For example, in terms of preconditioning matrices for use in conjugate gradient-based image processing problems, the Finite Element Preconditioner generally begins operation by evaluating the local structure of a coefficient matrix derived from the image data. The Finite Element Preconditioner then performs a recursive set of variable eliminations, combined with a simplification of the resulting coarse level problems to obtain bases better suited for problems with inhomogeneous (spatially varying) data, smoothness, and boundary constraints. Once the preconditioning has been completed, the preconditioned matrix can then be used by conventional data processing techniques for achieving the desired computational output.

Figure 2:
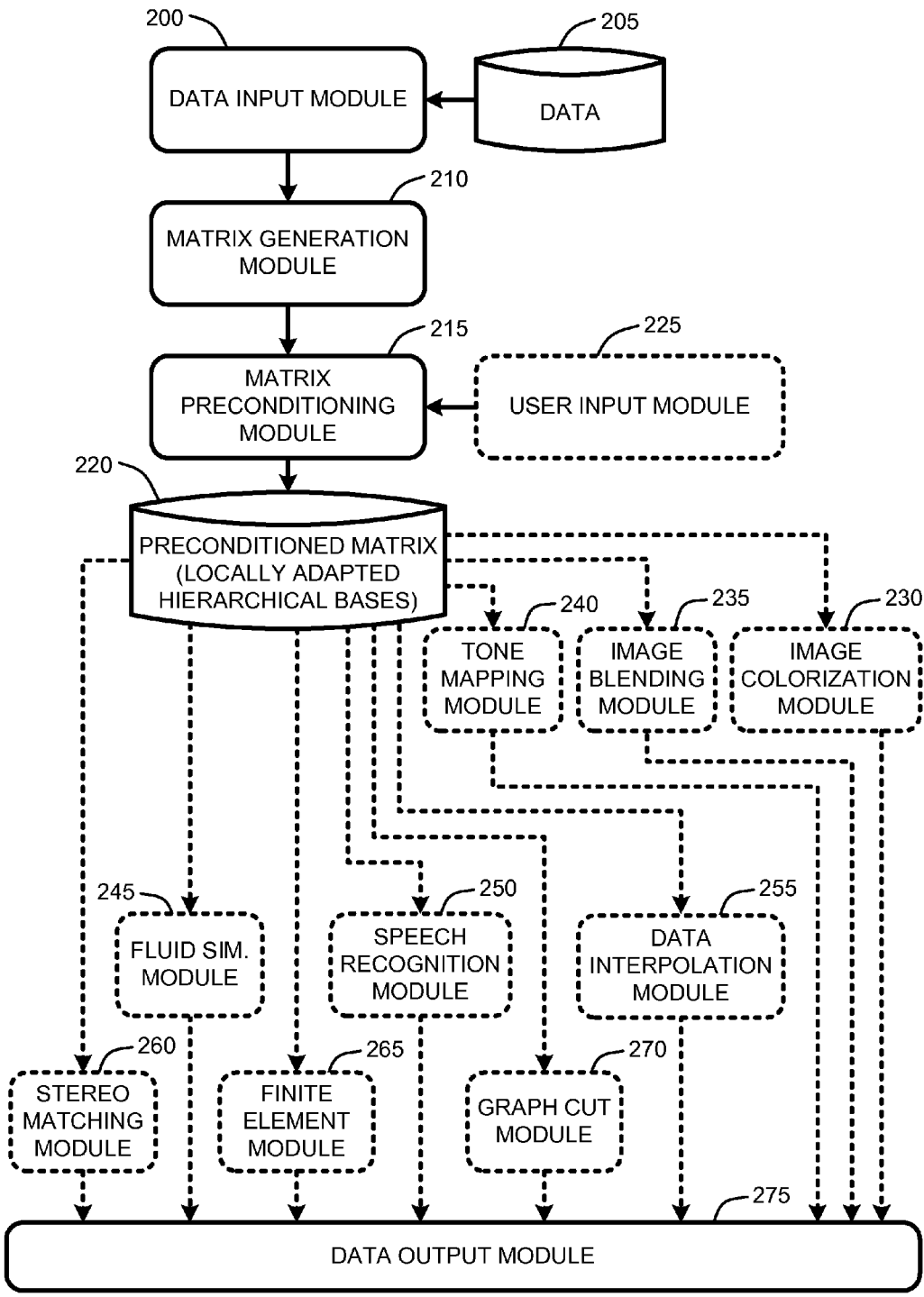
FIG. 2 illustrates an exemplary architectural system diagram showing exemplary program modules for implementing the Finite Element Preconditioner.

2.2 System Architectural Overview:

The processes summarized above are illustrated by the general system diagram of FIG. 2. In particular, the system diagram of FIG. 2 illustrates the interrelationships between program modules for implementing the Finite Element Preconditioner, as described herein. It should be noted that any boxes and interconnections between boxes that are represented by broken or dashed lines in FIG. 2 represent alternate embodiments of the Finite Element Preconditioner described herein, and that any or all of these alternate embodiments, as described below, may be used in combination with other alternate embodiments that are described throughout this document.

In general, as illustrated by FIG. 2, the Finite Element Preconditioner generally begins operation by using a data input module 200 to receive a set of data 205 representing a problem to be addressed. For example, in the case where the Finite Element Preconditioner will be used to precondition data 205 for tone mapping an image, the data received by the data input module 200 is one or more images. Similarly, in the case where the Finite Element Preconditioner will be used to precondition data 205 to perform dynamic fluid simulations, the data will represent local properties of the fluid being simulated.

In any case, once the data input module 205 receives the data 200, the data is passed to a matrix generation module 210 that evaluates the data to construct a conventional matrix representation of that data. This matrix is then passed to a matrix preconditioning module 215 that first evaluates the matrix to identify a connection strength (also referred to herein as a "data constraint" or a "spring" connection, as discussed in Section 3) between each matrix element and each of its neighboring matrix elements, along with any local discontinuities.

Once the matrix preconditioning module 215 has identified the connection strengths and any local discontinuities, the matrix preconditioning module then performs a recursive set of matrix element eliminations, combined with a simplification of the resulting coarse level problems to obtain a set of hierarchical basis functions (one set for each hierarchical level) for preconditioning the original matrix derived from the data 205. In other words, a set of hierarchical coarse level matrix representations of the original data 205 are prepared by the matrix preconditioning module 215 by recursively replacing matrix elements in coarse level matrices as a function of the connection strengths between neighboring matrix elements. The result of this preconditioning is referred to as a "preconditioned matrix" 220 which has bases (at each hierarchical level) that are better suited for solving problems with inhomogeneous (spatially varying) data, smoothness, and boundary constraints than the original matrix derived from the data 205. As is well known to those skilled in the art, a "preconditioner" is a matrix that is used to speed up an iterative solver (see section 3.3 for a detailed discussion of this point).

Note that depending upon the particular application that will be used by the Finite Element Preconditioner for further processing the preconditioned matrix 220, a user input module 225 may also be used to provide additional information to be used by the matrix preconditioning module 215. For example, as described in further detail in Section 3.7.1, in the case where the Finite Element Preconditioner will be used to colorize a grey scale image, a user will provide a sparse set of color strokes across one or more regions of the original input image (data 205). This sparse set of color strokes will then be used by the matrix preconditioning module 215 for generating the preconditioned matrix 220.

Once the preconditioned matrix 220 has been generated, it is provided to any one of a number of conventional program modules (230 through 270) for further processing. The resulting data output from the program module (230 through 270) is then provided via a data output module 275. For example, in the case where the Finite Element Preconditioner will be used to colorize a grey scale image, the preconditioned matrix 220 is provided to an image colorization module 240. This image colorization module 240 then uses conventional image colorization techniques to construct a colorized image from the original grey scale image (data 205) from the preconditioned matrix 220. This colorized image is then output via data output module 275. Again, as noted above, the input data 205 is specific to the particular application that will use that data for further processing. Examples of additional program modules used by the Finite Element Preconditioner include:

1) An image colorization module 230 for colorizing an original grey scale image (or re-coloring an original color image) provided as data 2-5. See Section 3.7.1 for a simple example of an image colorization application. Note that given the novel preconditioning provided in the form of the preconditioned matrix 215, the image colorization module 230 uses conventional image colorization techniques for performing the above noted applications, with the results then being provided via the data output module 275.

2) An image blending module 235 for blending two or more images as a function of the preconditioned matrix 220 derived from the input data (205). In general, the image blending module 235 is used for applications such as removing visual artifacts when a cutout is pasted into a new background, reducing visual discontinuities across image seams, etc. See Section 3.7.2 for a simple example image blending applications. Note that given the novel preconditioning provided in the form of the preconditioned matrix 215, the image blending module 235 uses conventional image blending techniques for performing the above noted applications, with the results then being provided via the data output module 275.

3) A tone mapping module 240 for tone mapping an input image as a function of the preconditioned matrix 220 derived from the input data 205. See Section 3.7.3 for a simple example of tone mapping. Note that given the novel preconditioning provided in the form of the preconditioned matrix 215, the tone mapping module 240 uses conventional tone mapping techniques for tone mapping the input image, with the results then being provided via the data output module 275.

4) A fluid simulation module 245 for modeling fluid flows (including liquid, gas and plasma dynamics) resulting from one or more inputs (provided via the user input module) to a set of data 205 representing the initial fluid conditions. Note that given the novel preconditioning provided in the form of the preconditioned matrix 215, the fluid simulation module 245 uses conventional fluid analysis techniques for simulating the resulting fluid dynamics and providing the desired data output via the data output module 275.

5) A speech recognition module 250 for recognizing recorded speech, provided as input data 205. Typical speech recognition applications include speech to text applications, speech control of computer-based applications, etc. Note that given the novel preconditioning provided in the form of the preconditioned matrix 215, the speech recognition module 250 uses conventional speech recognition techniques for providing the desired data output via the data output module 275.

6) A data interpolation module 255 for providing interpolation for sparse data sets. In particular, the data interpolation module 255 is used for solving inhomogeneous 2D interpolation/reconstruction problems. Note that given the novel preconditioning provided in the form of the preconditioned matrix 215, the data interpolation module 255 uses conventional data interpolation techniques for providing the desired data output via the data output module 275.

7) A stereo matching module 260 for extracting depth information from two or more points of reference (corresponding to matched pixels from two or more input images 205) for a single three-dimensional point. The resulting depth information is then used for a number of well known purposes. Note that given the novel preconditioning provided in the form of the preconditioned matrix 215, the stereo matching module 260 uses conventional stereo matching techniques for providing the desired data output via the data output module 275.

8) A finite element module 265 for providing finite element analysis of an input data set 205 representing nodes and links in a system defined by the input data set. Note that various inputs (forces, perturbations, displacements, etc) may be provided via the user input module 225 for use in preconditioning the resulting preconditioned matrix 215. Finite element analysis, and the uses thereof are well known to those skilled in the art, and will not be described in detail herein. Note that given the novel preconditioning provided in the form of the preconditioned matrix 215, the finite element module 265 uses conventional finite element analysis techniques for providing the desired data output via the data output module 275.

9) A graph cut module 270 for segmenting an input image 205. In general, as is well known to those skilled in the art, typical graph cut segmentation applications use a sparse set of simple grouping cues (such as local (pairwise) pixel similarity) for segmenting images into their constituent elements through an iterative energy minimization process. Note that given the novel preconditioning provided in the form of the preconditioned matrix 215, the graph cut module 270 uses conventional graph cut techniques for providing the desired data output via the data output module 275.

It should be appreciated by those skilled in the art that the example applications described in the proceeding paragraphs are only a few of the many applications that are enabled by the Finite Element Preconditioner described herein. In fact, it should be clear that many conventional data processing applications that are adapted to perform iterative solutions as a function of a preconditioned matrix will benefit through reduced computational overhead when using the techniques for providing preconditioning through the use of locally adapted hierarchical basis functions, as described herein.

3.0 Operation Overview:

The above-described program modules are employed for implementing the Finite Element Preconditioner described herein. As summarized above, this Finite Element Preconditioner provides a system and method for preconditioning matrices for use in solving iterative highly inhomogeneous 2D interpolation/reconstruction problems. The following sections provide a detailed discussion of the operation of the Finite Element Preconditioner, and of exemplary methods for implementing the program modules described in Section 2.

In addition, it should be noted that the following discussion generally describes the preconditioning techniques provided by the Finite Element Preconditioner in terms of processing image data. However, as noted above, the preconditioning techniques provided by the Finite Element Preconditioner are also applicable to the solution of many other large optimization problems, such as, for example, stereo matching, speech recognition, graph cut segmentation, fluid simulations, finite element analysis, etc. However, for purposes of explanation, the techniques enabled by the Finite Element Preconditioner will be described herein in terms of preconditioning matrices used in iterative conjugate gradient-based solutions to various image processing problems.

3.1 Operational Details of the Finite Element Preconditioner:

The following paragraphs detail specific operational embodiments of the Finite Element Preconditioner described herein. In particular, the following paragraphs describe an overview of the optimization problem being solved; techniques for solving sparse linear systems; hierarchical basis functions in one-dimensional problems; hierarchical basis functions in two-dimensional problems; GPU implementation for preconditioning matrices in conjugate gradient-based problems; and example image processing embodiments and implementations of the Finite Element Preconditioner.

3.2 Optimization Problem Overview:

Many problems in computer graphics are formulated using a variational approach which involves defining a continuous two-dimensional optimization problem, adding appropriate regularization terms, and then discretizing the problem on a regular grid. The discretization of these variational formulations leads to quadratic forms with large sparse symmetric positive definite (SPD) coefficient (a.k.a. Hessian or stiffness) matrices that have a natural embedding in a two-dimensional grid and are hence amenable to multilevel approaches.

3.2.1 One-Dimensional Problems:

The simplest example of these types of variational problems is one-curve interpolation, where the problem is to reconstruct a function $f(x)$ that approximately interpolates a set of data points $\{d_k\}$ at locations $\{x_k\}$ with associated weights $\{w_k\}$. In solving such problems, a first order smoothness penalty (functional) is typically added such that:

$$s = \int s(x) f_x^2(x) dx \qquad \text{Equation 1}$$

where $s(x)$ is the spatially varying smoothness weight, which can be used to locally control discontinuities. Note that higher order smoothness functionals can also be used.

To discretize the above problem, a regular grid spacing of size h is chosen, and any data constraints are placed at discrete grid locations, which results in the discrete energy given by Equation 2, where:

$$E_d = \sum_i w_i (f_i - d_i)^2 \qquad \text{Equation 2}$$

with $w_i=0$ where there are no data points. This energy term can be considered in the context of physical springs, where a sample set of input data values $d_i$ and weights $w_i$, are considered as points pulling on a surface $f_i$ with stronger springs, and wherein weaker springs connect the remaining points to the 0 baseline (since $w_i=0$ where there are no data points).

Therefore, to discretize the smoothness functional, conventional finite element analysis is used to model the function $f(x)$ as a piecewise linear spline. Then, analytically integrating the energy functional in terms of s, gives the energy as:

$$E_s = \sum_i s_i (f_{i+1} - f_i)^2 \qquad \text{Equation 2}$$

with the value for $s_i$ given by $s_i = h^{-2} \int_{x_i}^{x_{i+1}} s(x) dx = s/h$, for a constant $s(x)=s$.

3.2.2 Two-Dimensional Problems:

Two-dimensional variational problems can be formulated in a manner similar to that of the one-dimensional problem described above. However, rather than simply reconstructing $f(x)$, in the 2-D case, it is necessary to reconstruct $f(x, y)$ through a set of data points $\{d_k\}$ at locations $\{x_k, y_k\}$ with associated weights $\{w_k\}$. In this case, the two-dimensional first order smoothness functional (such as a conventional "membrane model") can be written as:

$$s = \int s^x(x,y)f_x^2(x,y) + s^y(x,y)f_y^2(x,y)dxdy \qquad \text{Equation 4}$$

Discretizing this functional leads to a first order smoothness term as illustrated by Equation 5, where:

$$E_s = \sum_{i,j} s_i^x(f_{i+1,j} - f_{i,j} - g_{i,j}^x)^2 + s_i^y(f_{i+1,j} - f_{i,j} - g_{i,j}^y)^2 \qquad \text{Equation 5}$$

The data values $g_{i,j}^x$ and $g_{i,j}^y$ are gradient data terms (constraints) used by conventional algorithms such as HDR (High Dynamic Range) tone mapping, Poisson blending, and gradient-domain blending. In the first order case, these terms are 0 when discretizing the conventional first order smoothness functional illustrated in Equation 4. The smoothness weights $s_i^x$ and $s_i^y$ control the location of horizontal and vertical tears (or weaknesses) in the surface of the "membrane." The two dimensional discrete data energy is written as:

$$E_d = \sum_{i,j} w_{i,j}(f_{i,j} - d_{i,j})^2 \qquad \text{Equation 6}$$

Similar to the 1-D case, finite element analysis is again used to obtain the discrete energies of Equation 6. For example, one well known conventional technique uses piecewise linear right-angled triangular spline elements for the membrane model. Further, because the squared derivatives get integrated over local two-dimensional patches of area $h^2$, the discrete first order squared smoothness terms become independent of h.

Consequently, for both the one and two-dimensional problems, the total energy of the discretized problem can be written as a quadratic form, where:

$$E = E_d + E_s = x^T A x - 2x^T b + c \qquad \text{Equation 7}$$

where $x = [f_0 \ldots f_1]$ is called the "state vector." Further, the sparse symmetric positive-definite matrix A is called the Hessian since it encodes the second derivative of the energy function. Note that in the field of conventional numerical analysis, matrix A is typically called the "coefficient matrix," while in the field of conventional finite element analysis, matrix A is typically called the "stiffness matrix." For the one-dimensional first order problem, matrix A is tri-diagonal, while for the two-dimensional problem, it is multi-banded with 5 non-zero entries per row.

The b term in Equation 7 is referred to as the weighted data vector. Minimizing the quadratic form Equation 7 is equivalent to solving the sparse linear system:

$$Ax = b \qquad \text{Equation 8}$$

which, as described in Section 3.3.2, is often addressed by using techniques which include "preconditioning." Preconditioning generally provides relatively easy-to-compute approximate inverses of matrices, which are used to reduce computational overhead in solving sparse linear systems, such as the system of Equations 7 and 8.

3.3 Techniques for Solving Sparse Linear Systems:

The solution of sparse positive definite (SPD) linear systems of equations generally breaks down into two major classes of algorithms: direct and iterative.

Direct methods generally use sparse matrix representations together with stable factorization algorithms such as the well known LU (lower-upper) or Cholesky decompositions to obtain sparse symmetric factor matrices for which forward and backward substitution can be efficiently performed. Unfortunately, for two-dimensional problems, the factored matrices suffer from fill-in, i.e., the zero entries separating the main diagonal band and the off-diagonal bands (which result when the 2D variables are placed in raster order) get replaced with non-zero values. Furthermore, direct solvers, being sequential in nature, are not directly amenable to data-parallel execution on graphics processing units (GPUs) such as the processors used in conventional computer graphics cards.

In contrast, well known iterative relaxation algorithms such as gradient descent, successive over-relaxation (SOR), and conjugate gradient descent minimize the quadratic energy function of Equation 7 using a series of steps that successively refine the solution by reducing its energy.

Basic iterative algorithms can be accelerated using a variety of well known techniques, including, for example, multigrid methods (such as multi-resolution pyramids), hierarchical basis preconditioning, and tree-based preconditioning.

3.3.1 Multigrid Methods for Solving Sparse Linear Systems:

Conventional multigrid methods operate on a pyramid and alternate between solving the problem on the original (fine) level and projecting the error to a coarser level where the lower-frequency components can be reduced. This alternation between fine and coarse levels can be extended recursively by attacking the coarse level problem with its own set of inter-level transfers, which results in the commonly used V-cycle and W-cycle algorithms for traversing multi-resolution pyramids. Such techniques are well known to those skilled in the art, and will not be described in detail herein.

Conventional multigrid techniques are generally optimal for simple homogeneous problems. Unfortunately, the performance of conventional multigrid techniques degrades as the problem becomes more irregular. However, conventional algebraic multigrid solvers (AMG), which locally adapt the interpolation functions to the local structure of the coefficient matrix, can be more effective in these cases. However, conventional AMG solver techniques have not previously been adapted to computer graphics problems.

3.3.2 Preconditioners:

As noted above, one of the basic approaches to solving a linear system, Ax=b, involves the use of iterative methods that use successive approximations to obtain increasingly more accurate solutions to the linear system. In general, as is well known to those skilled in the art, preconditioners are easy-to-compute approximate inverses of matrices, used to speed up iterative linear solvers.

For example, when matrix A is positive definite, one conventional iterative method used to solve the corresponding linear system is referred to as "conjugate gradients" (CG). In the $i^{th}$ iteration, CG methods find the vector closest to the solution in the well known Krylov subspace, that is the subspace spanned by the vectors [b, Ab, . . . , A$^i$b]. It turns out that the Krylov subspace often contains a good approximation of the solution, even for small values of i.

In general, the convergence rate of CG depends on the distribution of the eigenvalues of matrix A. If the eigenvalues tend to be clustered away from the origin, then convergence is rapid. However, if the eigenvalues are distributed approximately evenly, and close to the origin, convergence is slow. As is known to those skilled in the art, the number of iterations needed for convergence is bounded by the square root of the conditioner number of matrix A, multiplied by a constant.

Consequently, improving (reducing) the condition number of the matrix reduces the computational overhead (through reduced iterations) when performing computations based on the preconditioned matrix.

As noted above, a "preconditioner" is a matrix used to speed up an iterative solver. For example, let M represent the preconditioner. Then, instead of solving Ax=b, the preconditioned system $M^{-1}Ax=M^{-1}b$ is solved. This transformation makes sense if the distribution of the eigenvalues of $M^{-1}A$ is better than that of matrix A. This generally means that $M^{-1}A$ has a small condition number. Intuitively, it is best to find a preconditioner such that $M^{-1}$ approximates $A^{-1}$. As a result, $M^{-1}A$ approximates the identity matrix, which has a condition number of 1.

3.3.2.1 Hierarchical Basis Preconditioning:

An alternative approach to solving sparse multi-dimensional relaxation problems combines the idea of multi-level techniques such as the multigrid techniques described in Section 3.3.1 with the idea of preconditioning. For example, instead of solving a series of multi-resolution sub-problems interspersed with inter-level transfers, conventional preconditioned conjugate gradient (PCG) techniques use the multi-level hierarchy to precondition the original system, i.e., to make the search directions more independent and better scaled. As a result, such problems are generally solved using fewer iterations, and thus less computational overhead, with PCG-based techniques.

The basic idea of conventional PCG techniques is to replace the original nodal variables $x=[f_0 \ldots f_{n-1}]$ with a new set of hierarchical variables y that lie on a multi-resolution pyramid which has been sub-sampled so that it has the same number of samples as the original problem. Because some of these new variables have larger bases (influence regions), the solver can take larger low-frequency steps as it iteratively searches for the optimal solution.

To convert between the hierarchical (multi-resolution) and nodal bases, a set of local interpolation steps is used, where:

$$x=Sy=S_1 S_2 \ldots S_{L-1} y \qquad \text{Equation 9}$$

As is known to those skilled in the art, the columns of S can be interpreted as the hierarchical basis functions corresponding to the nodal variables. For example, with respect to conventional wavelets, this operation is typically referred to as a "lifting scheme" for second generation wavelets.

The form of the individual inter-level interpolation functions $S_1$ is usually similar to that used in multigrid, e.g., linear interpolation for one-dimensional problems and bilinear interpolation for two-dimensional problems.

Conventional hierarchical basis preconditioning often outperforms multigrid relaxation on the kind of non-uniform scattered data interpolation problems that arise in finite element analysis and in low-level image processing. On the other hand, as more levels of preconditioning are used, the performance starts to degrade once the hierarchical bases become larger than the "natural" local spacing of the data. This is due to the fact that the bases are not properly adapted to particular interpolation problem at hand.

However, the Finite Element Preconditioner described herein takes into account both the strength of the data constraints and local discontinuities, and operates to derive an optimized set of hierarchical basis functions that are adapted to the local structure of the underlying image data.

3.4 Hierarchical Basis Functions in 1-D Problems:

The general idea in using a hierarchical basis for solving one-dimensional problems is to interpolate the solution obtained with a coarser level approximation, and then to add a local correction term in the finer level. However, if an exact solution is available at a coarser level, it is possible to predict an exact solution at the finer level. This is possible since, for the first order one-dimensional problem, each variable only interacts with its two nearest neighbors.

Therefore, if all of the even variables are placed in the coarse level, and the odd variables are kept in the fine level, it is possible to solve for each fine level variable independent of the others. For example, consider the $i^{th}$ row from the tri-diagonal system of linear equations of Equation 8, where:

$$a_{i,i-1}x_{i-1}+a_{i,i}x_i a_{i,i+1}x_{i+1}=b_i \qquad \text{Equation 10}$$

In this case, the solution for $x_i$ can be written as follows, where:

$$x_i=a_{i,i}^{-1}[b_i-a_{i,i-1}x_{i-1}-a_{i,i+1}x_{i+1}] \qquad \text{Equation 11}$$

Note that this "interpolant" does not, in general, interpolate the two parents, $x_{i-1}$ and $x_{i+1}$, since $((a_{i,i-1}/a_{i,i})+(a_{i,i+1}/a_{i,i}))<1$ whenever the data weight $w_i>0$. Further, it should also be noted that $w_i>0$ whenever there is any data present at a node. In fact, as the data weight at a point goes to infinity, i.e., as $w_i \to \infty$, then $x_i \to b_i/a_{i,i}=d_i$, and the target data value is interpolated exactly without using any smoothing. As is well known to those skilled in the art, this concept is an example of conventional "weighted wavelets."

Given these relationships, the above-described formula can be substituted simultaneously for $x_i$ for all odd values of i to obtain a new energy function that does not involve the odd variables. As is known to those skilled in the art, this concept is generally referred to as "cyclic reduction."

Another way to view this operation is to say that Equation 11 defines a locally adapted basis (interpolation) function. Then, with respect to Equations 8 through 11, permuting the entries in matrices A and S so that the fine level variables come first and the coarse level variables come second, these matrices can then be rewritten using the approximation rule, where:

$$A = \begin{bmatrix} D & E \\ E^T & F \end{bmatrix} \qquad \text{Equation 12}$$

and $$S_1 = \begin{bmatrix} I & -D^{-1}E \\ 0^T & I \end{bmatrix}$$

The resulting preconditioned coefficient matrix can therefore be written as:

$$\hat{A}_1 = S_1^T A S_1 = \begin{bmatrix} D & 0 \\ 0^T & F-E^T D^{-1} E \end{bmatrix} \qquad \text{Equation 13}$$

For the one-dimensional first order problem, D is a diagonal matrix, matrix E is 2-banded (2 nearest neighbors), and matrix F is also diagonal. The resulting (smaller) coarse-level coefficient matrix $\hat{A}_1^c = F - E^T D^{-1} E$ is therefore tri-diagonal, just like the original coefficients of matrix A.

Consequently, this matrix can be addressed recursively to construct a locally adapted set of hierarchical basis functions that convert the original coefficients into a diagonal matrix Â. As is known to those skilled in the art of iterative methods, the algorithm described above is generally referred to as a "complete factorization" of Â, since no approximations are used in this derivation. In fact, this is a special instance of the more general incomplete LU factorization with multi-elimination (ILUM) algorithm, which is described below.

The construction described above leads to the following reinterpretation of the well known "cyclic reduction algorithm" where, for a one-dimensional first-order problem, using the preconditioner $S\hat{A}^{-1}S^T$ results in perfect preconditioning and hence a one-step solution, where S is defined using the set of locally adapted hierarchical basis functions $S_f=[1-D_f^{-1}E_f]$, as described above, and where $\hat{A}$ is the resulting diagonal (preconditioned) multi-level coefficient matrix.

Unfortunately, this result only holds for one-dimensional first order problems. However, the general methodology developed above is further adapted so that it can be applied to two-dimensional problems, as described in further detail in Section 3.5.

3.5 Hierarchical Basis Functions in 2-D Problems:

As is known to those skilled in the art, in two dimensions, most hierarchical basis function approaches (as well as pyramid-based algorithms) eliminate odd rows and columns simultaneously, so that each coarser level has one quarter as many variables as the finer one. However, the fine-level variables being eliminated are not independent, which makes it difficult to apply the methodology described above.

Instead, by applying the well known numerical analysis concept of repeated red-black (RRB) ordering (or elimination), the "red" elements in a red-black checkerboard are eliminated first, followed by an elimination of the other half of the variables to move a full level up in the pyramid. This process is then repeated for each coarser level of the pyramid. Note that this is a particular instance of more general conventional multi-coloring strategies that can be applied in conjunction with incomplete LU with multi-elimination (ILUM) preconditioning. Half-octave pyramids are also sometimes used in image processing, where they are often referred to as quincunx sampling.

Figure 3:
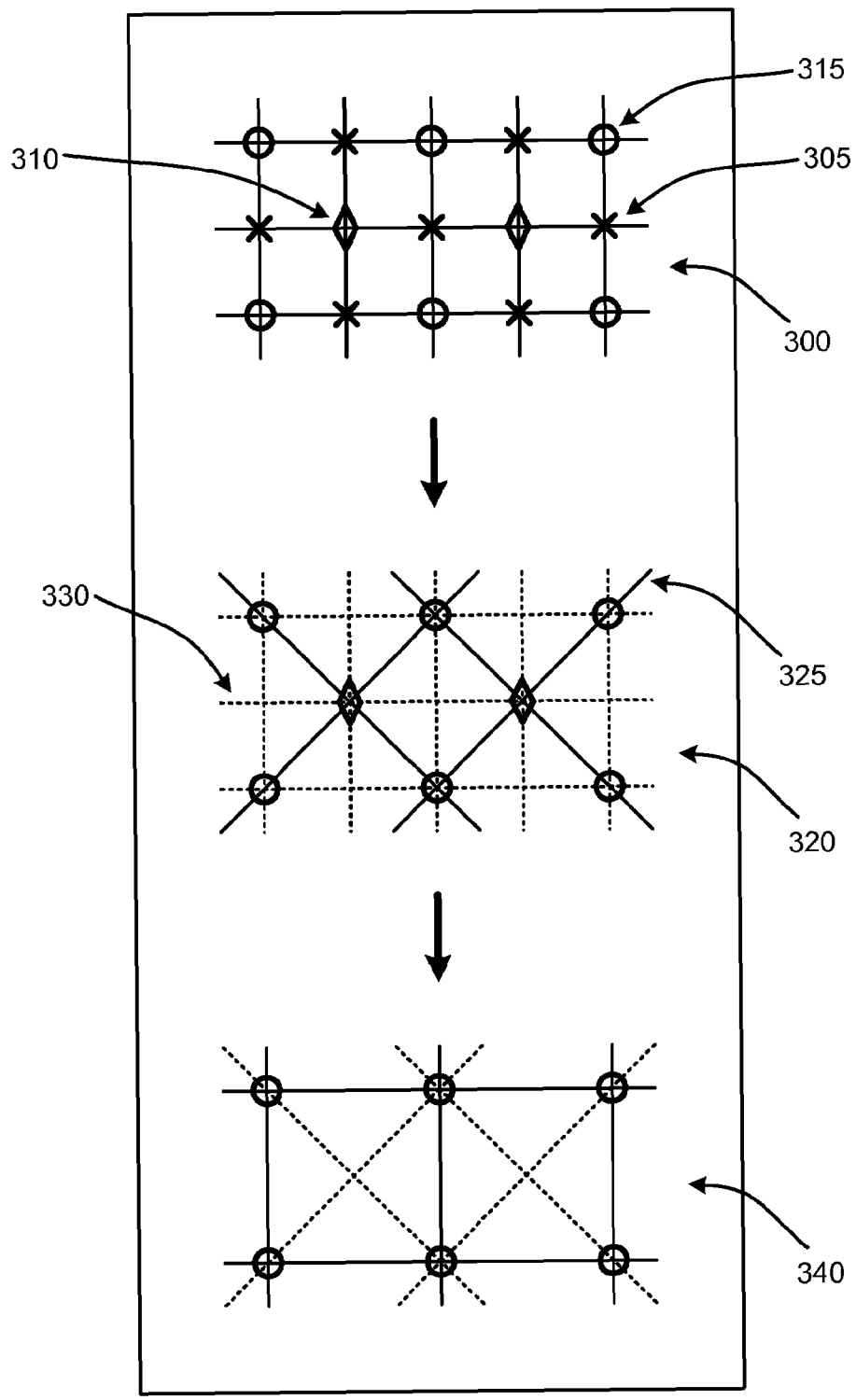
FIG. 3 illustrates an example of variable elimination using repeated red-black (RRB) ordering or elimination.

This concept can be viewed pictorially, as illustrated by FIG. 3, where the X's 305 are eliminated in the first pass 300 and the diamonds 310 are eliminated in the second pass 320. The solid lines 325 indicate the connections (non-zero entries in matrix A) between variables, while the dashed lines 330 indicate undesirable connections, which are eliminated, as described below.

In particular, similar to the one-dimensional case described in Section 3.4, matrix D is a diagonal matrix, matrix E is 4-banded (4 nearest neighbors), and matrix F is also diagonal (with the points represented by crosses and diamonds in FIG. 3 being independent of each other). The resulting $\hat{A}_1^c$ matrix is 9-banded, with each element (represented graphically here by circles and diamonds) depending on its immediate 4-neighbors (with these dependencies represented by solid lines in FIG. 3, and in FIG. 4A through 4D), and also depending on its diagonal 2-D neighbors (with these dependencies represented by dashed lines in FIG. 3, and in FIG. 4A through 4D).

3.5.1 Conventional Solutions in the 2-D Space:

In order to keep the bandwidth of the matrix from growing, the diagonal connections are eliminated. Typically, a number of conventional techniques eliminate these diagonals by performing an incomplete factorization, which means simply dropping any undesired elements (conventionally known as "ILU(0)"). Other conventional techniques eliminate unwanted elements by adding the dropped values to the diagonal to preserve affine/interpolatory properties of the resulting system (known as "modified ILU" or "MILU"). Further, another conventional technique (known as "relaxed ILU" or "RILU") provides a blend of these two approaches, by adding a fraction, ω, of the dropped elements to the diagonal.

3.5.2 Finite Element Preconditioner Solutions in the 2-D Space:

In contrast to the conventional techniques described in Section 3.5.1 for preconditioning the resulting $\hat{A}_1^c$ matrix, the Finite Element Preconditioner described herein provides a novel preconditioning approach that reduces computational overhead, and increases the accuracy of the resulting solution. This preconditioning approach provides a novel variation on well understood multi-level preconditioner techniques for solving highly inhomogeneous 2D interpolation/reconstruction problems, such as, for example, scattered data interpolation over discontinuous domains, reconstruction from locally weighted gradients, and propagation of constraints with locally varying smoothness.

Further, the preconditioning approach described below is generally discussed in terms of a first order two-dimensional problem. However, as should be understood by those skilled in the art, the preconditioning approach described below can be extended to cover second or higher order problems in one, two, or higher dimensions. In addition, this preconditioning approach can also be extended to non-quadratic energy minimization problems such as dynamic programming (which can be used for stereo matching or speech recognition).

In general, the preconditioning process provided by the Finite Element Preconditioner are related to algebraic multigrid (AMG) techniques. However, in contrast to AMG, the Finite Element Preconditioner uses preconditioned conjugate gradients instead of multigrid, since unlike the multigrid techniques of conventional AMG, the preconditioned conjugate gradients provided by the Finite Element Preconditioner can compensate for the imperfect coarsening that is endemic in most real-world problems. In addition, the techniques provided by the Finite Element Preconditioner are also related to incomplete lower-upper factorization with multi-elimination (ILUM) on a red-black (multicolor) grid.

Conventional AMG techniques attempt to remedy some of the shortcomings of traditional multigrid techniques, which assume a fixed uniform set of coarsening and interpolation kernels, by adapting these kernels to the underlying structure (continuity and stiffness) of the finite element problem being solved. Further, some AMG techniques use the same basic multi-elimination equations to define the interlevel transfer operators as ILUM. As with ILUM, small terms in the resulting coarser level coefficient matrix are again neglected in order to keep the system bandwidth from growing excessively.

However, in contrast to such techniques, the Finite Element Preconditioner redistributes these otherwise neglected terms to other off-diagonal and on-diagonal entries in a way that preserves a good finite-element approximation to the original variational problem. In fact, the Finite Element Preconditioner performs the same first step of problem reduction/coarsening of conventional ILUM techniques. However, the Finite Element Preconditioner differs significantly from conventional ILUM techniques in how the undesired off-diagonal entries are treated, as described in detail below.

For example, conventional ILUM techniques traditionally simply drop coefficient matrix entries that are of small magnitude relative to other entries in a given row. Conventionally, this is known as ILU with thresholding, or "ILUT." However, in stark contrast to such techniques, rather than dropping such terms, the Finite Element Preconditioner re-distributes these entries to other off-diagonal and on-diagonal entries in a way that preserves a good finite-element approximation to the original variational problem.

In particular, rather than simply dropping terms or adding them to the diagonal, as in conventional preconditioning techniques, the process provided by the Finite Element Preconditioner uses finite-element analysis to replace the dropped "links" or dependencies (energy terms) with approximately equivalent terms on the links that are not dropped. Note that these replacement energy terms cannot be exact, because it is not possible to replace the energy in a dropped diagonal link exactly with the sum of two energies along the remaining links.

In particular as described in further detail in the following paragraphs, rather than thinking of the undesired matrix elements as abstract quantities, the Finite Element Preconditioner views them as mechanical "springs" whose impact on the overall system is approximated by stiffening adjacent (non-eliminated) springs. The idea here is to make the coarsened energy function (which has a quadratic form with enforced zero entries) be as good as possible an approximation to the original energy of the overall system.

3.5.2.1 Equal Element Connection Strengths:

The general spring-based idea introduced above is illustrated by several examples, as described below for the case where element connection strengths are equal. For example, in the simplest case, if the data constraint is so strong that the unwanted connections in $D^{-1}E$ are essentially zero, there is no problem since these "zero" connections can be dropped without adversely affecting the coarsened energy function.

Figure 4A:
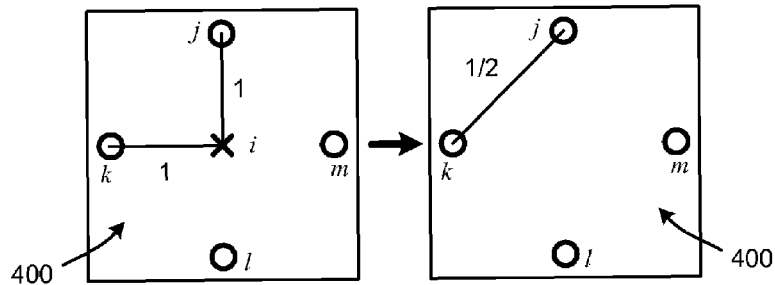
FIG. 4A illustrates an example of variable elimination and link energy (connection strength) redistribution in a "rotated grid" where the eliminated variable depends on two of its four neighbors in accordance with the Finite Element Preconditioner, as described herein.

Similarly, as illustrated by FIG. 4A, when an undesired matrix element, element i (represented by an X), only depends on an adjacent pair of neighbors, elements j and k (represented by circles), with the strength of the remaining connections between element i and elements l and m being zero (and thus not shown), this induces a single new link (dependence) represented by a solid line between elements j and k. In this case, the set of five adjacent elements 400 to the left of the arrow shows the original (non-zero) connections between element i and the two adjacent elements (elements j and k) along with their original weights (1 in this case). The set of four elements 410 to the right of the arrow show the remaining connection between elements j and k after elimination of element i.

Note that the grid of elements illustrated in FIG. 4A through FIG. 4D represent a subset of five adjacent points from FIG. 3 (see 300, for example) that have been rotated by 45 degrees to more clearly illustrated the ideas described herein. Further, it should also be noted that the element grids of FIG. 4A through FIG. 4D are also referred to herein as "rotated grids." It should be understood that these grids are not actually rotated when preconditioning matrices, and that this rotation is only shown for purposes of clarifying the graphical examples of the process.

Figure 4B:
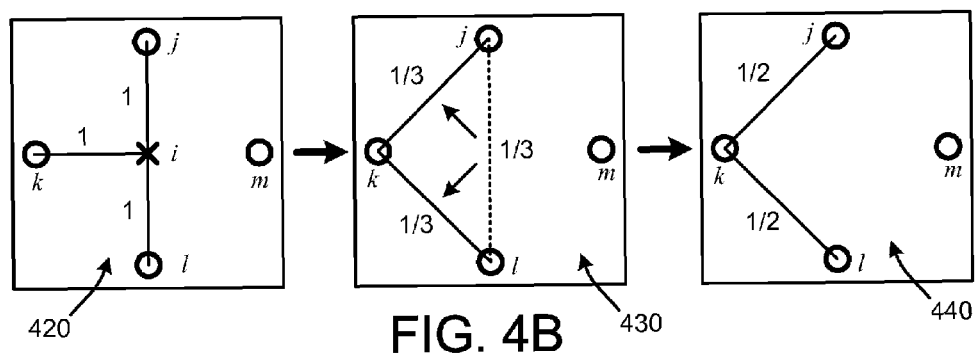
FIG. 4B illustrates an example of variable elimination and link energy (connection strength) redistribution in a "rotated grid" where the eliminated variable depends on three of its four neighbors in accordance with the Finite Element Preconditioner, as described herein.

In the case where three out of the four connections 420 to the element i are non-zero, as illustrated by FIG. 4B, this configuration is viewed as a triangular finite element. Therefore, if the original weights between the neighbors of element i are 1, it is easy to demonstrate (by substituting the average value $(x_j+x_k+x_l)/3$ for $x_i$, where the term $x_j$ represents the connection strength between element i and element j) that the resulting energy has connections of strengths 1/3 between the remaining neighbors 430 shown in FIG. 4B. Further, for a triangular element (delimited by elements j, k and l (430)) of area $h^2$ with unit smoothness s=1, the diagonal connections should be 1/2, so that they add up to 1 after the other side of each link is also eliminated, as shown by the remaining connections 440 on the right side of FIG. 4B.

Further, as discussed above in Section 3.2, finite element analysis indicates that the membrane energy in 2D does not scale with h. Therefore, it is reasonable to "distribute" half of the strength along the vertical dashed line (see box 430) to each of its two neighbors, which results in the desired pair of values (1/2, 1/2) between elements j and k, and elements k and l, respectively, as shown in box 440 following elimination of element i.

Figure 4C:
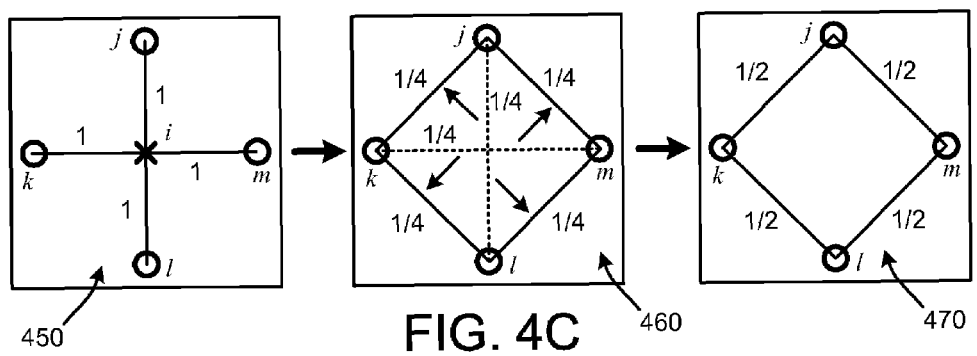
FIG. 4C illustrates an example of variable elimination and link energy (connection strength) redistribution in a "rotated grid" where the eliminated variable depends on all four of its four neighbors in accordance with the Finite Element Preconditioner, as described herein.

Next, in the case where all four of the connections 450 to the element i are non-zero, as illustrated by FIG. 4C, an analysis similar to that described with respect to FIG. 4B is performed. This analysis shows that the vertical and horizontal connection strengths (box 460) can be evenly distributed between the adjacent neighbors after being scaled up by a factor of 2. This results in a final connection strength of 1/2 on each of the remaining diagonal connections (see box 470) following elimination of element i.

While each of the above described cases are useful when the connection strengths between each of the elements is the same, the special cases described above do not address the problem where the connection strengths are not the same. Consequently, as described in further detail below, the Finite Element Preconditioner described herein provides a novel technique for addressing element elimination in the case where the connection strengths may not be the same.

3.5.2.2 Arbitrary Element Connection Strengths:

As noted above, with respect to any five adjacent elements (i.e., an unwanted element and its nearest four neighbors) in a 2D space, there are three non-negligible cases:

1. An undesired matrix element depends on connections between an adjacent two of the four adjacent neighbors;
2. An undesired matrix element depends on connections between three of the four adjacent neighbors; and
3. An undesired matrix element depends on connections between all four of the four adjacent neighbors.

Unfortunately, the element elimination techniques described above do not satisfactorily address the problem where the connection strengths between the neighbors are not the same. Therefore, to address this problem, the Finite Element Preconditioner described herein provides a novel technique for reducing such problems to one of the three special cases described above in Section 3.5.2.1.

In general, for the two-dimensional membrane, after multi-elimination of the red (cross) variables of the matrix (see the discussion of repeated red-black (RRB) elimination in Section 3.5), any remaining "diagonal" connection strengths are distributed in the "rotated grid" to each connection's nearest neighbors, using the relative weighting of the original four connections, with appropriate scaling. Note that using weights of zero for a given connection will reduce the problem to one of the three cases described above.

In other words, the RRB-based elimination for eliminating "red variables," introduces unwanted diagonal connections between A matrix entries that are not immediate neighbors. Note that a simple example of these unwanted connections is provided in FIGS. 4B, 4C, and 4D, where unwanted connections between elements j and l (and between elements k and m) result from the elimination of unwanted element i in the center of each rotated grid. The Finite Element Preconditioner completes the computation of the first level hierarchical bases by redistributing these unwanted connection strengths to "diagonal" connections between the nearest four neighbors using relative weighting of the original four connections, with appropriate scaling (see FIG. 4A through 4D). This process is then repeated for computing the hierarchical bases for each successively coarser hierarchical level until the highest (coarsest) desired hierarchical level is reached. Note that this redistribution of connection strengths is automatically tailored to best approximate an energy function corresponding to the connection strengths of each grid prior to elimination of the unwanted matrix elements.

In particular, if an unwanted variable $x_i$ originally has connections to each of its four nearest neighbors, with those connections having weights $a_{ij} \ldots a_{im}$ (see FIG. 4D), and the interpolation (adapted hierarchical basis) weights are $s_{ij} \ldots s_{im}$, then the connections in the new coarser-level coefficient matrix $\hat{A}_1$ (see Equation 13) corresponding to those finite elements will be:

$$\hat{a}_{jk} = a_{ii} s_{ij} s_{ik}$$

$$\hat{a}_{kl} = a_{ii} s_{ik} s_{il}$$

$$\hat{a}_{lm} = a_{ii} s_{il} s_{im}$$

$$\hat{a}_{jm} = a_{ii} s_{ij} s_{im} \qquad \text{Equation 14}$$

respectively, where each connection, $\hat{a}_{jk}, \hat{a}_{kl}, \hat{a}_{lm}, \hat{a}_{jm}$, will also receive a contribution from the finite elements bordering it on the other side.

Figure 4D:
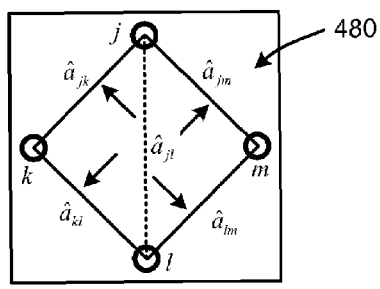
FIG. 4D illustrates an example of variable elimination and link energy (connection strength) redistribution in a "rotated grid" where the eliminated variable depends on all four of its four neighbors, and those connection strengths have arbitrary values, in accordance with the Finite Element Preconditioner, as described herein.

However, while this approach provides a good preconditioning solution, it can introduce undesired connections between nodes j and l, shown as a dashed line between nodes j and l in FIG. 4D, and also between nodes k and m (not shown in FIG. 4D for purposes of clarity).

Therefore, in one embodiment, these undesired connections, between nodes j and l, and between nodes k and m, are redistributed to the neighboring pairs jk . . . jm. To do this, the Finite Element Preconditioner first computes the relative weights, $w_{jk}, w_{kl}, w_{lm}, w_{jm}$, for each of the four allowable links as illustrated by Equation 15, where, for example:

$$w_{jk} = \frac{\hat{a}_{jk}}{\sum_{lm} \hat{a}_{lm}} \qquad \text{Equation 15}$$

and where $w_{kl}, w_{lm}, w_{jm}$ are computed in a similar manner to $w_{jk}$. Each of the allowable link weights is then updated as illustrated by Equation 16, where, for example:

$$\hat{a}_{jk} \leftarrow \hat{a}_{jk} + s_N w_{jk} \hat{a}_{jl} \qquad \text{Equation 16}$$

and where $w_{kl}, w_{lm}, w_{jm}$ are updated in a similar manner to $w_{jk}$. The diagonal connections are also adjusted to maintain the balance between off-diagonal and diagonal connections in $\hat{A}_1$. Note that $s_N$ is a scaling factor chosen so that the coarse level coefficient matrix in homogenous (constant smoothness) regions is the same as would be obtained by applying finite element analysis at the coarser level. For example, in the case of a typical multi-resolution pyramid with half-octave (quincunx) sampling a value of $s_N = 2$ is used. It should also be noted that where the connection strength between an unwanted element and one of its neighbors is essentially zero, then the problem described above is simplified to a one-, two-, or three-neighbor connection case, as described above, with the corresponding weights being zero.

It should be noted that the above description refers to the use of "red" and "black" "coloring" for use in an RRB-based variable elimination in the 2D case. Clearly, as is known to those skilled in the art, the specific use of red and black coloring works only in the 2D case. However, as noted above, the techniques described herein are extensible to higher order matrices. As a result, different "coloring" schemes are used to eliminate variables in higher order cases (3D and above), with the identification and redistribution of unwanted connections being performed as a function of the order of the matrices being preconditioned.

3.6 GPU Implementation for Preconditioning Conjugate Gradients:

In one embodiment, the processes described above for implementing locally adaptive hierarchical basis preconditioning are adapted for use in conventional graphics processing units (GPU) such as the processing unit of most conventional computer graphics cards. One advantage to using such GPUs for implementing locally adaptive hierarchical basis preconditioning is that most conventional GPUs have already been optimized to process conventional conjugate gradient and multigrid algorithms, and such GPUs typically have very high floating-point performance. As a result, in one embodiment, the Finite Element Preconditioner provides programmatic extensions to existing GPU capabilities for implementing locally adaptive hierarchical basis preconditioning in a GPU for taking advantage of this existing optimization.

For example, as is well known to those skilled in the art, the basic operations in conjugate gradient operations, include the evaluation of the residual vector r, and the computation of the new conjugated direction d and step size. Evaluation of the residual vector r involves the sparse matrix multiplication Ax−b, while the computation of the new conjugated direction d and step size involves the computation of two inner products. Both of these basic operations map naturally onto conventional GPUs, as is well known to those skilled in the art.

Further, it should be noted that that the A matrix, which has only 4 non-zero entries per row, is stored naturally alongside all of the other vector (image) quantities as a 4-banded float image. Similarly, the transformation of the current direction vector by the $S^T$ and S matrices involves nothing more than the inter-level transfer operations present in multigrid, where the spatially varying entries in each $S_l$ matrix can also be stored in a 4-banded image aligned with the quantities they are being applied to.

Consequently, the preconditioning process described above in Section 3.5.2.2 maps naturally to conventional GPU's, and can also be implemented o other CPU's or other specialized processors, as desired.

3.7 Example Implementations of the Finite Element Preconditioner:

As noted above, the Finite Element Preconditioner is useful for a number of purposes, including, for example, tone mapping, gradient domain blending, colorization, scattered data interpolation, stereo matching, speech recognition, graph cut segmentation, fluid simulations, finite element analysis, etc. The following paragraphs describe several embodiments of the Finite Element Preconditioner for solving several of these problems with respect to image data.

3.7.1 Colorization:

As is well known to those skilled in the art, colorization is the process of propagating a small number of color strokes to a complete gray-scale image, while attempting to preserve discontinuities in the image. As such, the techniques provided by the Finite Element Preconditioner described herein are very useful for solving such colorization problems.

For example, some conventional colorization techniques provide colorization by, in part, minimizing smoothness terms as a function of the differences between a pixel's value and the average of its eight neighbors. As such, it is not a first-order smoothness term and is not directly amenable to the locally adapted hierarchical basis functions described herein.

However, by replacing the smoothness terms of conventional colorization techniques with a simpler term that is more amenable to the locally adapted hierarchical bases described above, the Finite Element Preconditioner is able to solve such colorization problems with reduced computational overhead and improved colorization output.

In particular, in one embodiment, the Finite Element Preconditioner replaces the smoothness terms used by conventional colorization techniques by setting the horizontal and vertical smoothness strengths to be inversely proportional to the horizontal and vertical grayscale gradients. The conjugate gradient problem is then preconditioned using locally adapted hierarchical basis functions, as described above.

Figure 5A:
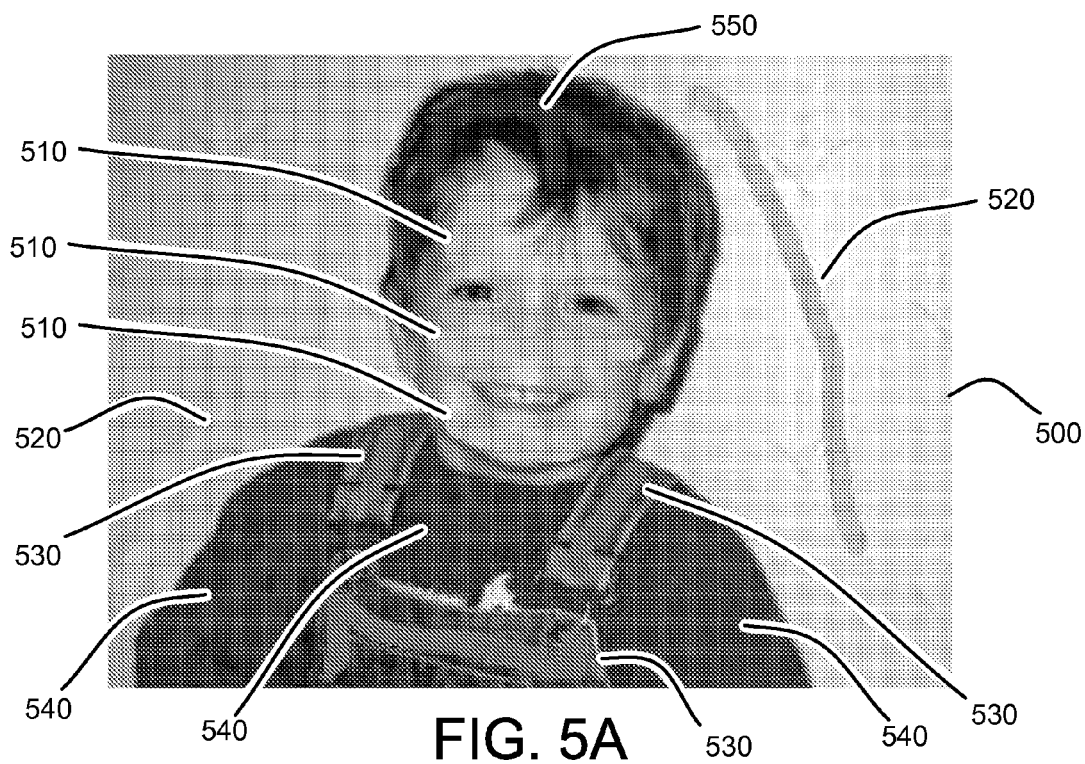
FIG. 5A illustrates a grey-scale image with a sparse set of color strokes used for initializing preconditioning a colorization algorithm for colorizing the grey-scale image, in accordance with the Finite Element Preconditioner, as described herein.
Figure 5B:
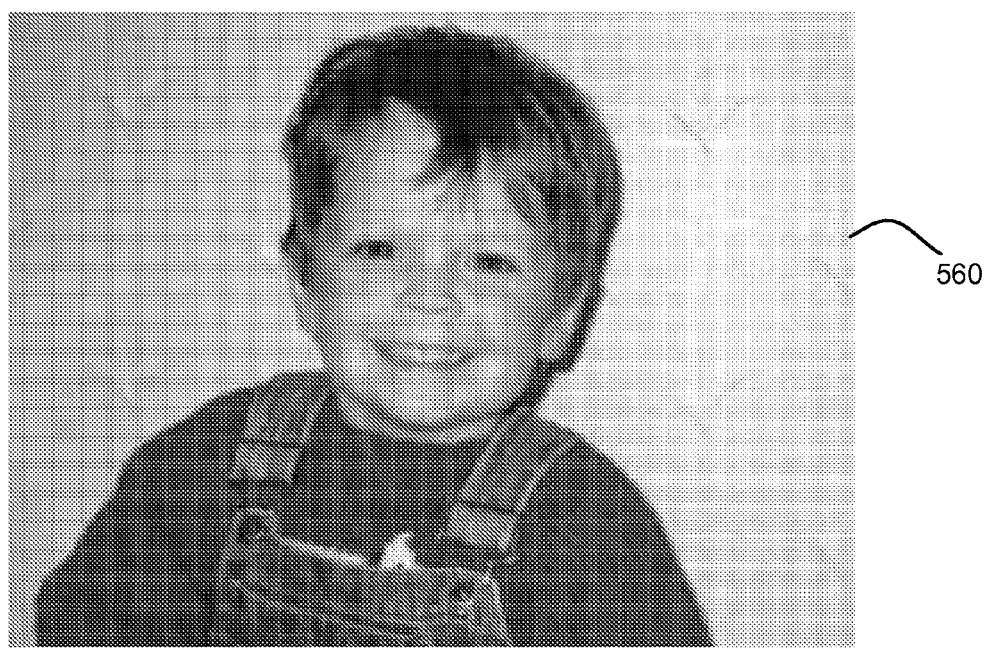
FIG. 5B illustrates a colorized version of the grey-scale image of FIG. 5A.

Specifically, as illustrated by FIG. 5A, a grey-scale image 500 is input into the Finite Element Preconditioner, and a sparse set of color strokes (510, 520, 530, 540, and 550) are applied to he image via a user interface. In general, these color strokes represent the desired average color for each region in which the strokes are applied. The conjugate gradient problem for solving the colorization problem is then preconditioned on the sparse set of color strokes (510, 520, 530, 540, and 550) using locally adapted hierarchical basis functions, as described above. The preconditioned conjugate gradient prepared from the original grey-scale image 500 then converges in just a few iterations to allow the Finite Element Preconditioner to produce the colorized version 560 of the original grey-scale image, as illustrated by FIG. 5B.

3.7.2 Poisson (Gradient Domain) Blending:

Another well known image processing technique is the use of Poisson blending for removing visual artifacts resulting from strong intensity or color differences when a cutout is pasted into a new background. Poisson blending has also been extended for use in non-linear variants, and to image stitching, where it is used to reduce visual discontinuities across image seams. In general, Poisson blending relies on reconstructing an image that matches, in a least-squares sense, a gradient field that has been computed from the various images that contribute to the final mosaic. As with the colorization process described in Section 3.7.1, the Finite Element Preconditioner described herein is very useful for solving such Poisson blending problems.

Figure 6A:
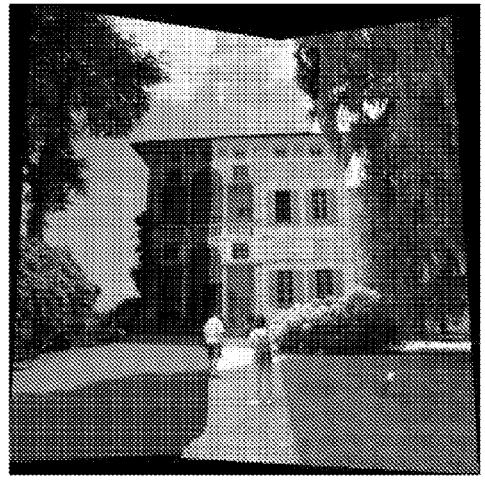
FIG. 6A illustrates an original two-image stitch prior to the use of blending for matching the two images across the seams.
Figure 6B:
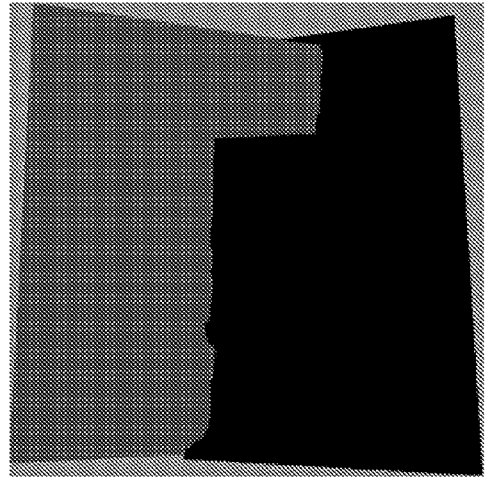
FIG. 6B illustrates a conventional label field, indicating where each pixel is drawn from for use in blending the stitched image of FIG. 6A.
Figure 6C:
FIG. 6C illustrates a blended image, obtained using just a few iterations on the locally adapted hierarchical basis preconditioned conjugate gradient derived from the input images of FIG. 6A by the Finite Element Preconditioner, and the label field shown in FIG. 6B.

For example, FIG. 6A shows an original two-image stitch prior to the use of blending for matching the two images across a seam. FIG. 6B image shows a conventional label field, indicating where each pixel is drawn from. FIG. 6C shows the blended image, obtained using just a few iterations on the locally adapted hierarchical basis preconditioned conjugate gradient derived from the input images and the label field shown in FIG. 6A and FIG. 6B, respectively. Note that in order to achieve this blending, rather than selecting a single pixel as a hard constraint to remove the overall shift ambiguity between the stitched images, a weak constraint towards the unblended original image was used.

3.7.3 Tone Mapping:

Another well known image processing technique is the use of gradient domain high dynamic range compression for providing image tone mapping operations. In general, conventional techniques for providing gradient domain high dynamic range compression begin operation by first computing the vertical and horizontal gradients of a log-luminance function from an input image, and then compressing those gradients through a non-linearity to reconstruct a compressed log-luminance function that is then used for tone mapping the original input image.

Figure 7A:
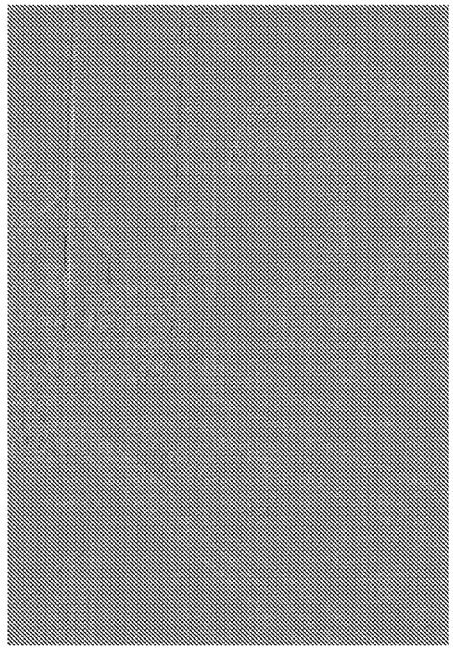
FIG. 7A illustrates a horizontal compressed gradient field derived from an input image.
Figure 7B:
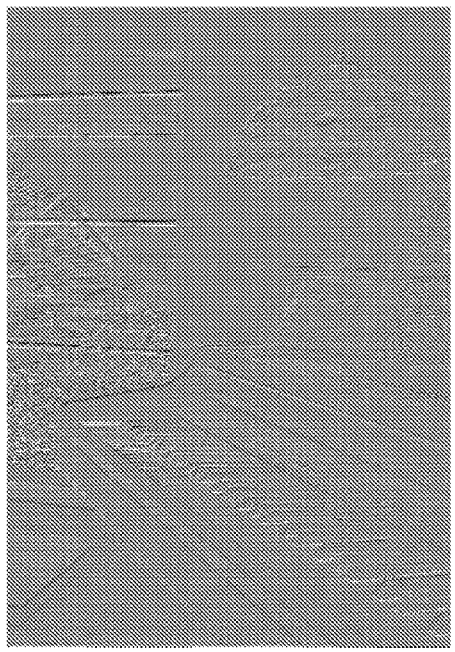
FIG. 7B illustrates a vertical compressed gradient field derived from the same input image used to derive the horizontal compressed gradient field of FIG. 7A.
Figure 7C:
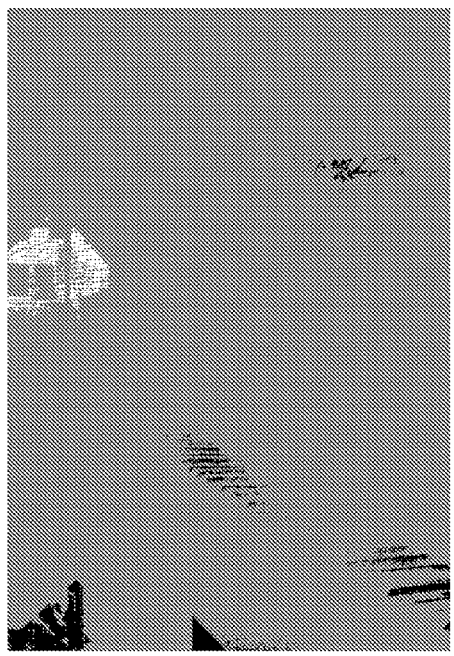
FIG. 7C illustrates a sparse set of constraints used to clamp the dark and light values for tone mapping the original input image.
Figure 7D:
FIG. 7D illustrates a reconstructed log-luminance function derived from the input image by the Finite Element Preconditioner from the compressed gradient fields shown in FIG. 7A and FIG. 7B.

However, as with the colorization and blending techniques described above, the Finite Element Preconditioner reduces computational overhead when preconditioning the gradients using locally adapted hierarchical basis functions, as described above. For example, FIG. 7A illustrates a horizontal compressed gradient field derived from an input image, while FIG. 7B represents a vertical compressed gradient field derived from the same input image. FIG. 7C shows a sparse set of constraints used to clamp the dark and light values, while FIG. 7D shows the reconstructed log-luminance function. This log luminance function derived from the input image by the Finite Element Preconditioner is then applicable for use in conventional tone mapping applications.

Figure 8:
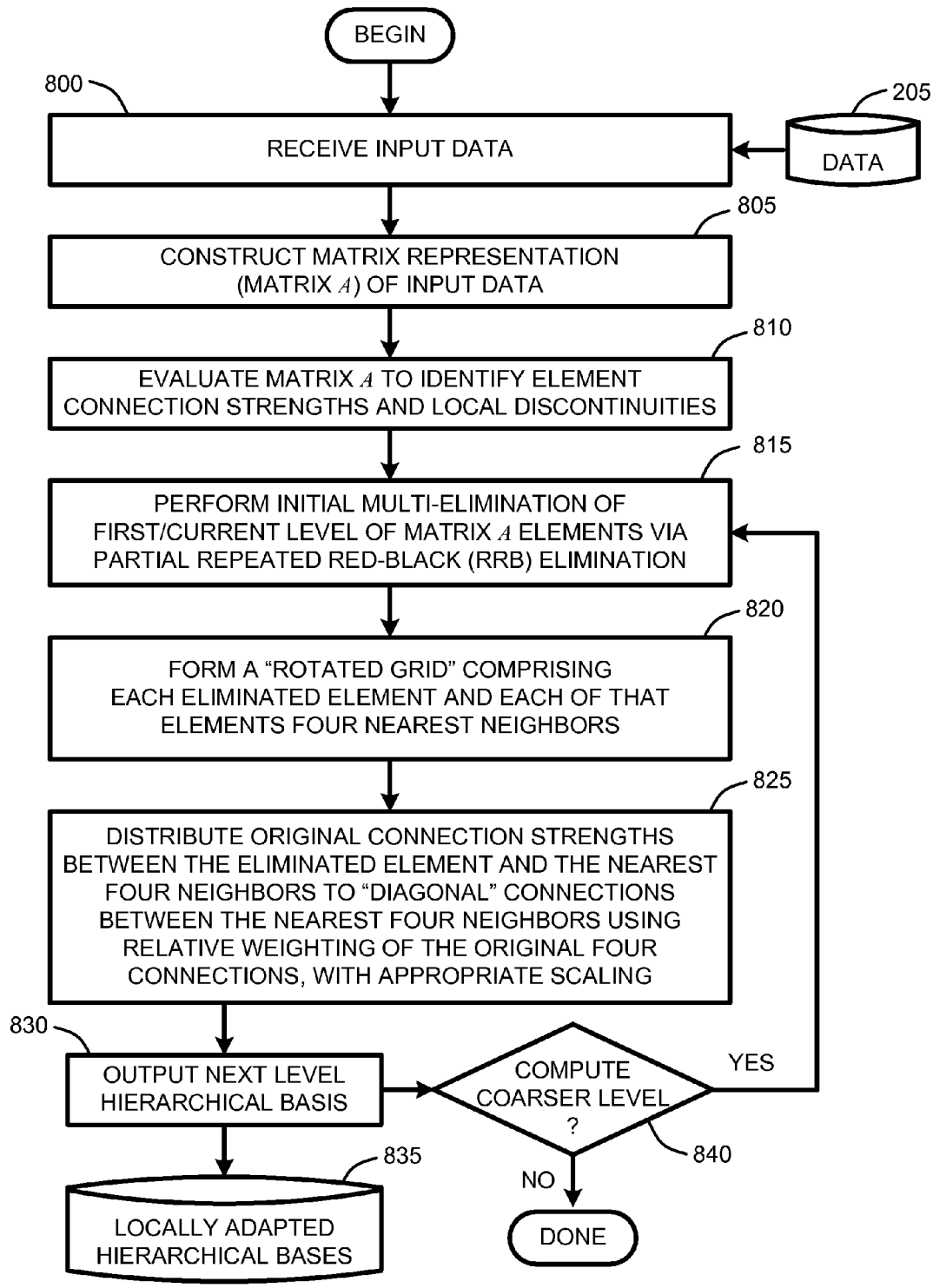
FIG. 8 illustrates an exemplary system flow diagram for preconditioning conjugate gradient-based iterative problems using locally adapted hierarchical basis preconditioning.

4.0 Finite Element Preconditioner Operation:

The processes described above with respect to FIG. 2 through FIG. 7, and in view of the detailed description provided above in Section 3, are summarized by the general operational flow diagram of FIG. 8, which illustrates an exemplary operational flow diagram for constructing locally adapted hierarchical bases from a set of input data.

In general, as illustrated by FIG. 8, the Finite Element Preconditioner provides locally adapted hierarchical basis functions for preconditioning large data optimization problems. In other words, the Finite Element Preconditioner provides a set of preconditioned matrices from a matrix derived from a set of input data, and potentially one or more additional user inputs, depending upon the specific application.

In particular, the Finite Element Preconditioner begins operation by receiving 800 a set of input data 205 representing a particular problem to be addressed. For example, as described above, in the case where the Finite Element Preconditioner will be used to precondition data 205 for tone mapping an image, that data will represent one or more input images. Note that matrix representations of the input data 205 can be provided directly in the case that such information is available.

However, in the case that the matrix representation of the input data 205 is not available, that matrix representation is automatically constructed 805 by the Finite Element Preconditioner. Construction of such matrices is a process that is well known to those skilled in the art.

Once the Finite Element Preconditioner has constructed 805 the matrix representation of the input data 205, the Finite Element Preconditioner then evaluates 810 that matrix to identify element (variable) connection strengths and any local discontinuities. This identified information is then used to perform 815 an initial round of variable eliminations for the first hierarchical basis level by eliminating only the "red" variables from the matrix representation of the input data 205 via a partial repeated red-black (RRB) elimination.

However, in contrast to conventional RRB techniques, the Finite Element Preconditioner then redistributes the resulting unwanted new connections. In particular, the partial round of RRB elimination eliminates the red variables, but introduces unwanted connections between A matrix elements (remaining "black" variables) that are not immediate neighbors in the rotated grid 820 (such as connections between elements j and l, or elements k and m as shown in FIG. 4B through 4D). In general, these connections between non-immediate neighbors are then redistributed by redistributing the original connection strengths between each additional eliminated element and its nearest four neighbors.

Specifically, these unwanted connection strengths are redistributed 825 to the "diagonal" connections (of the "rotated grid" 820) between the nearest four neighbors using relative weighting of the original four connections, with appropriate scaling (see FIG. 4A through 4D, and discussion in Section 3.5.2). The resulting locally adapted bases are then output 830 as the first level of the locally adapted hierarchical bases 835.

For each successively coarser 840 hierarchical level, the "black" variables remaining from the previous iteration are recolored into a new red set and a black set, and the red (half) subset of this new reduced set of variables is again eliminated as described above with respect to boxes 815 through 830. These processes are then repeated for computing the hierarchical bases for each successively coarser 840 hierarchical level until the highest (coarsest) desired hierarchical level is reached.

The resulting set of locally adapted hierarchical basis functions 835 are then provided for use in solving the desired data optimization problem (i.e., tone mapping, gradient domain blending, colorization, scattered data interpolation, etc.), as described above.

The foregoing description of the Finite Element Preconditioner has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the Finite Element Preconditioner. It is intended that the scope of the invention be limited not by this detailed description, but rather by the claims appended hereto.

What is claimed is:

1. A system for generating a set of locally adapted hierarchical basis functions for preconditioning a finite element analysis of a set of input data, comprising using a computing device to perform steps for:

receiving an input matrix, having two or more dimensions, which represents a set of input data;

identifying a set of unwanted matrix elements from the input matrix;

evaluating the input matrix to identify original connection strengths between the unwanted matrix elements and each unwanted matrix element's immediately neighboring matrix elements;

for each unwanted matrix element, forming a grid comprising one of the unwanted matrix elements and its immediately neighboring matrix elements;

for each grid, eliminating each unwanted matrix element and forming new connections between each remaining element in the grid, each new connection having a new connection strength determined as a function of the original connection strengths;

for each grid, for each new connection between matrix elements that connects matrix elements that are not immediately adjacent neighbors, eliminating those new connections and redistributing the strength of those eliminated new connections to the remaining new connections between the matrix elements that are immediately adjacent neighbors to construct a first level coarse matrix having new connection strengths; and outputting the first level coarse matrix and the new connection strengths as a first hierarchical basis function for preconditioning the input matrix.

2. The system of claim 1 further comprising computing one or more subsequent hierarchical levels of coarse matrices having new connection strengths, wherein each subsequent hierarchical level is computed from the coarse matrix of the immediately preceding hierarchical level by performing steps for:

identifying a new set of unwanted matrix elements from the coarse matrix of the immediately preceding hierarchical level;

evaluating the coarse matrix of the immediately preceding hierarchical level to identify connection strengths between the new set of unwanted matrix elements and each of those matrix elements immediately neighboring matrix elements;

forming a set of grids, each grid comprising one of the new unwanted matrix elements and its immediately neighboring matrix elements;

for each grid, eliminating each unwanted matrix element and forming new connections between each remaining element in the grid, each new connection having a new connection strength determined as a function of the original connection strengths;

for each grid, for each new connection between matrix elements that connects matrix elements that are not immediately adjacent neighbors, eliminating those new connections and redistributing the strength of those eliminated new connections to the remaining new connections between the matrix elements that are immediately adjacent neighbors to construct a subsequent level coarse matrix having new connection strengths; and outputting the subsequent level coarse matrix and the new connection strengths as a subsequent hierarchical basis function for preconditioning the coarse matrix of the immediately preceding hierarchical level.

3. The system of claim 1 wherein redistributing the strength of the eliminated new connections to the remaining new connections comprises adjusting the connection strengths of the remaining new connections to best approximate an overall energy function of each grid prior to elimination of the unwanted matrix element in that grid.

4. The system of claim 1 wherein redistributing the strength of the eliminated new connections to the remaining new connections comprises adjusting the connection strengths of the remaining new connections by distributing a scaled fraction of the connection strength of each eliminated new connection to the neighboring connections based on their relative values.

5. The system of claim 1 wherein the set of input data represents pixels of an input image, and wherein the input image is colorized by performing steps for iteratively computing a conjugate gradient-based colorization solution from the preconditioned input matrix as a function of a sparse set of desired color values that represent desired average colors for one or more regions of the input image.

6. The system of claim 1 wherein the set of input data represents pixels of two partially overlapping input images, and wherein the input images are stitched and blended across a seam by performing steps for iteratively computing a conjugate gradient-based blending solution from the preconditioned input matrix.

7. The system of claim 1 wherein the set of input data represents pixels of an input image, and wherein the input image is tone mapped by performing steps for iteratively computing a conjugate gradient-based tone mapping solution from the preconditioned input matrix.

8. A computer readable memory having computer executable instructions for constructing a hierarchical basis function from a set of input data, said computer executable instructions comprising:

receiving a set of input data;

constructing an input matrix from the input data;

constructing a first coarse level representation of the input matrix by:

evaluating the input matrix to identify original connection strengths between neighboring matrix elements, identifying a set of unwanted matrix elements to be eliminated from the input matrix, eliminating the unwanted matrix elements, and forming a new set of connections between non-eliminated matrix elements, each new connection having a new connection strength determined as a function of the original connection strengths;

identifying an undesirable subset of the new connections;

eliminating the undesirable new connections, and redistributing the connection strengths of the eliminated connections to the remaining new connections, and wherein the redistribution of connection strengths comprises adjusting the connection strengths of the new connections to best approximate an overall energy function of neighboring matrix elements prior to the elimination of the unwanted matrix elements; and outputting the remaining matrix elements and the new connection strengths as a first coarse level representation of the input matrix for use as a first hierarchical basis function.

9. The computer readable memory of claim 8 wherein the input matrix is two-dimensional, and wherein eliminating the unwanted matrix elements comprises computer executable instructions for performing a partial red-black elimination to eliminate red elements from the set of unwanted matrix elements.

10. The computer readable memory of claim 8 further comprising computer executable instructions for computing one or more subsequent coarse level representations of the input matrix, wherein each subsequent coarse level is computed from the coarse level matrix of the immediately preceding level by:

identifying a new set of unwanted matrix elements from the matrix of the immediately preceding level;

evaluating the matrix of the immediately preceding level to identify new original connection strengths between the new set of unwanted matrix elements and each of the matrix elements immediately neighboring each unwanted matrix element;

eliminating the each of the new set unwanted matrix elements, and forming a new set of connections between the remaining non-eliminated matrix elements, each new connection having a new connection strength determined as a function of the new original connection strengths;

identifying an undesirable subset of the new connections;

eliminating the undesirable new connections, and redistributing the connection strengths of the eliminated connections to the remaining new connections; and outputting the remaining matrix elements and the new connection strengths as a subsequent coarse level representation of the immediately preceding level matrix for use as a subsequent hierarchical basis function.

11. The computer readable memory of claim 10 wherein each of the hierarchical basis functions form a hierarchical multi-resolution pyramidal representation of the input data.

12. The computer readable memory of claim 11 wherein the input data is an image, and wherein the hierarchical multi-resolution pyramidal representation of the input data is used to provide an iterative conjugate gradient-based colorization of the input image.

13. The computer readable memory of claim 12 wherein a user interface is used to allow a user to manually specify average color values for one or more regions of the image for use in the colorization of the input image.

14. The computer readable memory of claim 11 wherein the input data is two or more partially overlapping images, and wherein the hierarchical multi-resolution pyramidal representation of the input data is used to provide an iterative conjugate gradient-based blending of the input images across one or more seams.

15. A method for preconditioning a matrix for use by a linear solver, comprising using a computing device for:

receiving an input matrix, said input matrix representing a set of input data;

evaluating the input matrix to identify original connection strengths between neighboring matrix elements;

identifying a set of unwanted matrix elements to be eliminated from the input matrix;

for each unwanted matrix element, forming a grid, each grid comprising one of the unwanted matrix elements and its immediately neighboring matrix elements;

for each grid, eliminating each unwanted matrix element and forming new connections between each remaining matrix element in that grid, each new connection having a new connection strength computed as a function of the original connection strengths;

eliminating undesirable new connections in each grid and redistributing the strengths of the eliminated new connections to the remaining new connections in each grid to construct a first coarse level representation of the input matrix;

computing one or more subsequent coarse level representations of the input matrix, wherein each subsequent coarse level representation is computed from the coarse level representation of the immediately preceding level, beginning with the first coarse level representation; and outputting each of the coarse level representations of the input matrix as a set of hierarchical bases for preconditioning the input matrix.

16. The method of claim 15 wherein redistributing the eliminated new connection strengths comprises adjusting the remaining new connection strengths to best approximate an overall energy function of each corresponding grid prior to the elimination of the unwanted matrix elements.

17. The method of claim 15 wherein redistributing the eliminated new connection strengths comprises adjusting the remaining new connection strengths by distributing a scaled fraction of the strength of each eliminated new connection to the remaining new connections based on their relative values.

18. The method of claim 15 wherein the set of hierarchical bases provides a hierarchical multi-resolution pyramidal representation of the input data.

19. The method of claim 18 wherein the input data is an image, and wherein the hierarchical multi-resolution pyramidal representation of the input data is used is used to provide an iterative conjugate gradient-based colorization of the input image as a function of one or more user specified average color values corresponding to one or more regions of the image.

20. The method of claim 18 wherein the input data is two or more partially overlapping images, and wherein the hierarchical multi-resolution pyramidal representation of the input data is used to provide an iterative conjugate gradient-based blending of the input images across one or more seams.

* * * * *